United States Patent Office 3,558,615

Patented Jan. 26, 1971

1

3,558,615

N-OXAZOLIDINE- AND N-TETRAHYDRO-1,3-OXAZINE-CARBOXANILIDES

George R. Haynes, Modesto, Calif., and Donald D. Phillips, Westfield, N.J., assignors to Shell Oil Company, New York, N.Y., a corporation of Delaware No Drawing. Filed July 8, 1968, Ser. No. 743,021
Int. Cl. C07d 87/06
U.S. Cl. 260—244 9 Claims

ABSTRACT OF THE DISCLOSURE

Certain N-(oxazolidine)- and N-(tetrahydro-oxazine)-carboxanilides are described which have microbicidal activity.

BACKGROUND OF THE INVENTION

Field of the invention

This invention relates to novel and useful oxygen and nitrogen N-heterocyclic carboxanilides. More particularly, it relates to novel and useful N-(oxazolidine)- and N-(tetrahydro-oxazine)-carboxanilides.

Description of the prior art

While many carboxanilides having biological activity have been reported in the literature, very few of these have been heterocyclic carboxanilides, and fewer yet where the heterocyclic group contained oxygen and nitrogen hetero atoms. An article by D. J. Beaver et al. (J. Am. Chem. Soc. 79, 1236 (1957)) discloses several such carboxanilides in which the heterocyclic group is morpholino; however these compounds were reported to have a low order of bacteriostatic activity compared to other carboxanilides.

SUMMARY OF THE INVENTION

Surprisingly, it has now been found that certain oxygen and nitrogen N-heterocyclic carboxanilides containing an oxazolidine or tetrahydro-oxazine heterocyclic moiety are highly active microbicides.

Accordingly, this invention is the novel class of oxazolidine and tetrahydro-oxazine carboxanilides.

DESCRIPTION OF THE PREFERRED EMBODIMENTS

The novel compounds of this invention can be described by the formula:

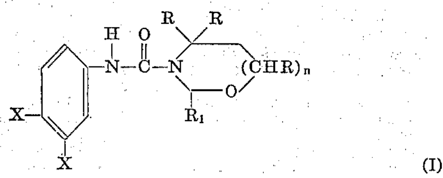

(I)

wherein each X, which may be the same or different, is chlorine or bromine, preferably chlorine, each R, which may be the same or different, is alkyl of 1–3 carbon atoms, $R_1$ is hydrogen, alkyl of 1–6 carbon atoms, preferably 1–3, alkenyl of 2–6 carbon atoms or phenyl and $n$ is 0 or 1.

The alkyl groups of R include methyl, ethyl, propyl, or isopropyl. The $R_1$ alkyl groups include those of R and others such as butyl, isobutyl, pentyl, 2-methylpentyl, hexyl and the like.

The alkenyls include vinyl, 1-propenyl, 2-propenyl, 2-methyl-1-propenyl, 1-butenyl, 3-butenyl, 2-methyl-3-butenyl, 2-pentenyl, 4-pentenyl, 3-methyl-1-butenyl, 3-hexenyl and the like. As is evident from the exemplary alkyls and alkenyls, they may be either branched or straight-chain in configuration.

2

Considering the heterocyclic moiety of the compounds depicted by Formula I, the compounds can have either the structure:

(II)

when $n$ is 0, or (III)

when $n$ is 1.

wherein R, $R_1$ and X are as previously defined.

Representative species of the 3-oxazolidinecarboxanilides of formula I ($n$ is 0) are:

3′,4′-dichloro-4,4-dimethyl-3-oxazolidinecarboxanilide,
3′-bromo-4′-chloro-4-methyl-4-ethyl-3-oxazolidinecarboxanilide,
3′,4′-dibromo-4,4-dipropyl-3-oxazolidinecarboxanilide,
3′,4′-dichloro-2,4,4-trimethyl-3-oxazolidinecarboxanilide,
3′-chloro-4′-bromo-2,4,4-trimethyl-3-oxazolidinecarboxanilide,
3′-chloro-4′-bromo-2-ethyl-4,4-dipropyl-3-oxazolidinecarboxanilide,
3′,4′-dichloro-2-butyl-4,4-dimethyl-3-oxazolidinecarboxanilide,
3′,4′-dibromo-2-hexyl-4,4-dimethyl-3-oxazolidinecarboxanilide,
3′,4′-dichloro-2-isopropyl-4-methyl-4-ethyl-3-oxazolidinecarboxanilide,
3′,4′-dichloro-2-vinyl-4,4-dimethyl-3-oxazolidinecarboxanilide,
3′,4′-dichloro-2-allyl-4,4-diethyl-3-oxazolidinecarboxanilide,
3′,4′-dibromo-2-(2-butenyl)-4,4-dimethyl-3-oxazolidinecarboxanilide,
3′,4′-dichloro-2-(5-hexenyl)-4,4-dimethyl 3-oxazolidinecarboxanilide,
3′,4′-dichloro-2-phenyl-4,4-dimethyl-3-oxazolidinecarboxanilide,
3′,4′-dibromo-2-phenyl-4,4-dipropyl-3-oxazolidinecarboxanilide and the like.

Representative species of the tetrahydro-2H-1,3-oxazine-3-carboxanilides of Formula I ($n$ is 1) are:

3′,4′-dichlorotetrahydro-4,4,6-trimethyl-2H-1,3-oxazine-3-carboxanilide,
3′-bromo-4′-chlorotetrahydro-4,4,6-trimethyl-2H-1,3-oxazine-3-carboxanilide,
3′,4′-dibromotetrahydro-4,4,6-tripropyl-2H-1,3-oxazine-3-carboxanilide,
3′,4′-dichlorotetrahydro-4-methyl-4-ethyl-6-propyl-2H-1,3-oxazine-3-carboxanilide,
3′,4′-dichlorotetrahydro-2,4,4,6-tetramethyl-2H-1,3-oxazine-3-carboxanilide,
3′,4′-dichlorotetrahydro-2-ethyl-4,4,6-trimethyl-2H-1,3-oxazine-3-carboxanilide,
3′,4′-dichlorotetrahydro-2-isopropyl-4,4,6-trimethyl 2H-1,3-oxazine-3-carboxanilide,
3′,4′-dichlorotetrahydro-2-butyl-4,4-diethyl-6-propyl-2H-1,3-oxazine-3-carboxanilide,
3′,4′-dibromotetrahydro-2-hexyl-4,4,6-trimethyl 2H-1,3-oxazine-3-carboxanilide, 3',4'-dichlorotetrahydro-2-vinyl-4,4,6,-trimethyl-2H-1,3-oxazine-3-carboxanilide,
3'-chloro-4'-bromotetrahydro-2-vinyl-4,4,6-trimethyl-2H-1,3-oxazine-3-carboxanilide,
3',4'-dichlorotetrahydro-2-allyl-4,4,6-triethyl-2H-1,3-oxazine-3-carboxanilide,
3',4'-dichlorotetrahydro-2-(2-butenyl)-4,4,6-trimethyl-2H-1,3-oxazine-3-carboxanilide,
3',4'-dichlorotetrahydro-2-(5-hexenyl)-4,4-dimethyl-6-ethyl-2H-1,3-oxazine-3-carboxanilide,
3',4'-dichlorotetrahydro-2-phenyl-4,4,6-trimethyl-2H-1,3-oxazine-3-carboxanilide,
3'-bromo-4'-chlorotetrahydro-2-phenyl-4,4,6-trimethyl-2H-1,3-oxazine-3-carboxanilide,
3',4'-dichlorotetrahydro-2-phenyl-4,4,6-triethyl-2H-1,3-oxazine-3-carboxanilide,
3',4'-dichlorotetrahydro-2-phenyl-4,4-dimethyl-6-propyl-2H-1,3-oxazine-3-carboxanilide, and the like.

Within the compounds of Formula I, it appears that the species having the highest microbicidal activities are those of the subclass where X is chlorine, R is methyl, $R_1$ is hydrogen, methyl or phenyl, preferably methyl, and $n$ is 1. This subclass is preferred. 3',4'-dichlorotetrahydro-2,4,4,6-tetramethyl - 2H - 1,3 - oxazine-3-carboxanilide is a particularly preferred species within this subclass.

PREPARATION

The carboxanilides of this invention may be prepared by reacting the appropriate oxazolidine or tetrahydro-2H-1,3-oxazine with a phenyl isocyanate; the intermediate oxazolidines and tetrahydro-2H-1,3-oxazine, in turn, are readily prepared by the condensation of an appropriate aminoalcohol and aldehyde.

The equimolar reaction of the oxazolidine,

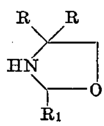

or tetrahydro-2H-1,3-oxazine,

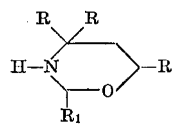

with the phenyl isocyanate,

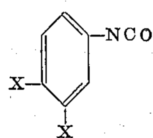

is carried out in a hydrocarbon solvent such as hexane at moderately low temperatures, i.e., about 10–50° C., preferably near room temperature. The crystalline carboxanilides which are formed, are easily separated by conventional techniques.

The reaction of the aminoalcohols of formulae:

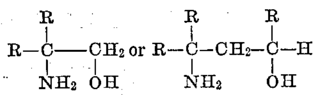

with an aldehyde of formula

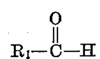

to form the oxazolidines and tetrahydro-2H-1,3-oxazines, respectively, is carried out in the liquid phase using equimolar proportions of aminoalcohol and aldehyde. Hydrocarbon solvents, preferably benzene, are used as solvents. The reaction is conveniently conducted at the reflux temperature of the solvent, especially when using benzene as the solvent, since the water of condensation is azeotropically removed. The oxazolidines and tetrahydro-2H-1,3-oxazines, which are high boiling liquids, are separated by conventional techniques such as by distillation.

The following examples are illustrative of the methods employed for preparation of the compounds of the invention.

EXAMPLE I

3',4'-dichloro-2,4,4-trimethyl-3-oxazolidinecarboxanilide (a) 2,4,4-trimethyl-oxazolidine.—Acetaldehyde (44 g., 1.00 mole) in 100 ml. of benzene was added dropwise at 25° C. to the stirred and cooled 2-amino-2-methyl-1-propanol (89 g., 1.00 mole). The reaction mixture was then heated at reflux and the water of condensation was removed azeotropically. After distilling the solvent the residue was distilled through a 30 cm. helices packed column to yield 106 g. (92% of theory) of the colorless liquid, 2,4,4-trimethyl-oxazolidine, B.P. 120–128° C. (760 mm.).

*Analysis.*—Calcd. for $NOC_6H_{13}$ (percent): Base equivalent, 115. Found (percent): Base equivalent, 118.

(b) 2,4,4-trimethyl-oxazolidine (11.5 g., 0.1 mole) was added at 15° C. to a solution of 3,4-dichlorophenyl isocyanate (18.8 g., 0.100 mole) in 200 ml. of hexane. Reaction temperature was allowed to rise to 30° C. and the solid which precipitated was filtered. The collected solid was recrystallized from hexane to give 30 g. (99% of theory) of the white solid, 3',4'-dichloro-2,4,4-trimethyl-3-oxazolidinecarboxanilide, M.P. 130–130.5° C.

*Analysis.*—Calcd. for $N_2O_2Cl_2C_{13}H_{16}$ (percent by weight): N, 9.2; Cl, 23.4. Found (percent by weight): N, 9.4; Cl, 24.2.

EXAMPLE II

3',4'-dichlorotetrahydro-2,4,4,6-tetramethyl-2H-1,3-oxazine-3-carboxanilide

Tetrahydro-2,4,4,6-tetramethyl-2H-1,3 - oxazine [1] (14.3 g.; 0.100 mole) in 100 ml. of hexane was added with stirring and cooling to 3,4-dichlorophenyl isocyanate (18.8 g.; 0.100 mole) in 50 ml. of hexane at 20–25° C. A colorless oil precipitated which solidified upon cooling to 0° C. The hexane layer was decanted and the precipitate was triturated with 100 ml. of pentane to give 30 g. (90% of theory) of white solid; M.P. 98–100° C. Trituration of this solid, 3',4'-dichlorotetrahydro-2,4,4,6-tetramethyl-2H-1,3-oxazine-3-carboxanilide, with hexane raised the melting point to 99–100° C.

*Analysis.*—Calcd. for $N_2O_2Cl_2C_{15}H_{20}$ (percent by weight): N, 8.5; Cl, 21.4. Found (percent by weight): N, 8.7; Cl, 21.4.

EXAMPLE III

3',4'-dichlorotetrahydro-4,4,6-trimethyl-2H-1,3-oxazine-3-carboxanilide (a) Tetrahydro - 4,4,6 - trimethyl - 2H - 1,3 - oxazine.—4-amino-4-methyl-2-pentanol (58.5 g., 0.500 mole) was added to a suspension of 15 g. (0.50 mole) of paraformaldehyde in 100 ml. of benzene. Heat was evolved and the paraformaldehyde all dissolved. Water of condensation was azeotropically removed with refluxing benzene. After distillation of solvent and lower boiling materials the product distilled at 117–118° C. (100 mm.) to give 60 g. (92% of theory) of the colorless liquid, tetrahydro-4,4,6-trimethyl-2H-1,3-oxazine.

*Analysis.*—Calcd. for $NOC_7H_{15}$ (percent): Base equivalent, 129. Found (percent): Base equivalent, 133.

(b) Tetrahydro - 4,4,6 - trimethyl - 2H - 1,3 - oxazine (12.9 g., 0.100 mole) in 50 ml. of hexane was added to 3,4-dichlorophenyl isocyanate (18.8 g., 0.100 mole) in 150 ml. of hexane at 25° C. The reaction was exothermic and a white solid quickly precipitated from the stirred and cooled solution. This solid was collected on a filter and washed with pentane to leave 28 gms. (90% of theory)

[1] U.S. 2,484,395.

of the white solid, 3',4'-dichlorotetrahydro-4,4,6-trimethyl-2H-1,3-oxazine-3-carboxanilide M.P. 125–126° C.

*Analysis.*—Calcd. for $N_2O_2Cl_2C_{14}H_{18}$ (percent by weight): N, 8.9; Cl, 22.5. Found (percent by weight): N, 9.1; Cl, 22.8.

EXAMPLE IV

3',4'-dichlorotetrahydro-2-phenyl-4,4,6-trimethyl-2H-1,3-oxazine-3-carboxanilide (a) Tetrahydro-4,4,6-trimethyl-2-phenyl-2H-1,3 - oxazine.—4-amino-4-methyl-2-pentanol (58.5 g.; 0.2 mole) and benzaldehyde (53 g.; 0.5 mole) were added to 100 ml. of benzene. The mixture was then heated at reflux and the water of condensation was removed azeotropically. After removing the solvent under vacuum, the residue was distilled to yield 96 g. of tetrahydro-4,4,6-trimethyl-2-phenyl-2H-1,3-oxazine, B.P. 90–91° C. (0.15 mm.).

*Analysis.*—Calcd. for $NOC_{13}H_{19}$ (percent): Base equivalent, 205. Found (percent): Base equivalent, 206.

(b) Tetrahydro-4,4,6-trimethyl-2-phenyl-2H - 1,3-oxazine (20.5 g.; 0.1 mole) was added to a solution of 3,4-dichlorophenyl isocyanate (18.8 g.; 0.1 mole) in 200 ml. of pentane at 20° C. The temperature rose to 33° C. and a yellow oil precipitated. The mixture was kept at 30–35° C. for 20 minutes and the pentane layer was decanted. The oil was then dried in a vacuum oven at 50° C. for 15 minutes to yield 18 g. of the glassy product. After the pentane layer above was stripped and dried under vacuum, 10 additional grams of glassy 3',4'-dichlorotetrahydro-2-phenyl-4,4,6-trimethyl-2H - 1,3 - oxazine-3-carboxanilide were obtained (total yield 46%).

*Analysis.*—Calcd. for $N_2O_2Cl_2C_{20}H_{22}$ (percent): N, 7.1; Cl, 18.1. Found (percent): N, 7.6; Cl, 18.4.

As previously pointed out, the compounds of this invention have been found to possess useful microbiological activity. In this regard the compounds have been found to be particularly effective in killing or inhibiting the growth of gram positive bacteria and acid fast bacteria. This effectiveness is demonstrated by the following example.

EXAMPLE V

Bactericidal activity

The compounds to be tested were suspended or dissolved in aceteone, isopropyl alcohol or other suitable solvents to form a concentrated solution or suspension. The final "use" concentrations were prepared by appropriate dilution of this concentrated solution or suspension. The final concentrations were added to sterile trypticase soy broth in tubes. The broth suspensions were then inoculated with 0.05 ml. of a broth culture of each test organism. The bacterial species were cultivated in trypticase soy broth. Prior to their use in the tests, the bacterial cultures were incubated for 24 hours at 35° C. After inoculation of the tubes with the test organisms, the tubes were incubated under standard appropriate conditions and examined for the presence of growth (no inhibitory effect) or the absence of growth (inhibition by the compound). These tubes were compared to a control culture and a chemical control series made in trypticase soy broth. The concentration, in p.p.m. (parts per million), indicate the minimum concentration to inhibit the growth of the organism.

The tests were conducted on representative compounds of the invention using *Staphylococcus aureus*, Smith strain as the gram positive bacteria and *Mycobacterium phlei* as the acid fast bacteria. The results are as follows:

| Test compound | Inhibitory concentration (p.p.m.) | |
|---|---|---|
| | *S. aureus*, Smith | *M. phlei* |
| 3',4'-diclhoro-2,4,4-trimethyl-3-oxazolidine-carboxanilide | 4 | 4 |
| 3',4'-dichlorotetrahydro-2,4,4,6-tetramethyl-2H-1,3-oxazine-3-carboxanilide | 0.125 | 0.5 |
| 3',4'-dichlorotetrahydro-4,4,6-trimethyl-2H-1,3-oxazine-3-carboxanilide | 1.0 | 1.0 |
| 3',4'-dichlorotetrahydro-2-phenyl-4,4,6-trimethyl-2H-1,3-oxazine-3-carboxanilide | 1.0 | 2.0 |

We claim as our invention:

1. A compound of the formula:

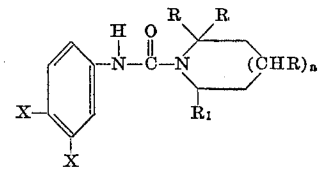

wherein each X, which may be the same or different, is chlorine or bromine; each R, which may be the same or different, is alkyl of 1–3 carbon atoms; $R_1$ is hydrogen, alkyl of 1–6 carbon atoms, alkenyl of 2–6 carbon atoms or phenyl; and $n$ is 0 or 1.

2. The compound of claim 1 wherein $R_1$ is hydrogen, alkyl of 1–3 carbon atoms or phenyl.

3. The compound of claim 2 wherein X is chlorine and $n$ is 0.

4. The compound of claim 3 wherein R and $R_1$ are methyl.

5. The compound of claim 2 wherein X is chlorine and $n$ is 1.

6. The compound of claim 5 wherein R is methyl and $R_1$ is hydrogen, methyl or phenyl.

7. The compound of claim 6 wherein $R_1$ is hydrogen.

8. The compound of claim 6 wherein $R_1$ is methyl.

9. The compound of claim 6 wherein $R_1$ is phenyl.

References Cited

UNITED STATES PATENTS 3,152,140 10/1964 Zenitz ---------- 260—307

OTHER REFERENCES

Beaver et al., J. Am. Chem. Soc. 79, 1236–45 (1957).

HENRY R. JILES, Primary Examiner

G. T. TODD, Assistant Examiner

U.S. Cl. X.R.

260—307; 424—248, 272

PO-1050
(5/69)

UNITED STATES PATENT OFFICE
CERTIFICATE OF CORRECTION

Patent No. 3,558,615 Dated January 26, 1971

Inventor(s) GEORGE R. HAYNES and DONALD D. PHILLIPS

It is certified that error appears in the above-identified patent and that said Letters Patent are hereby corrected as shown below:

In claim 1, column 6, lines 22 through 29 that portion of the structural formula reading

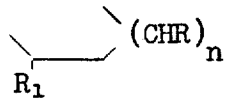

should read

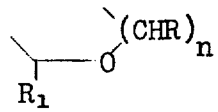

Signed and sealed this 13th day of July 1971.

(SEAL)
Attest:

EDWARD M.FLETCHER,JR.
Attesting Officer

WILLIAM E. SCHUYLER, JR.
Commissioner of Patents